United States Patent [19]

Kwak

[11] Patent Number: 5,452,093
[45] Date of Patent: Sep. 19, 1995

[54] HIGH SPEED COLOR VIDEO PRINTER FOR PRINTING COLOR IMAGE DATA IN SUCCESSIVE COLUMNS DURING BLANKING INTERVALS OF A VIDEO ROSTER SCAN

[75] Inventor: Hee-Kuk Kwak, Suwon-shi, Rep. of Korea

[73] Assignee: SamSung Electronics Co., Ltd., Suwon, Rep. of Korea

[21] Appl. No.: 888,857

[22] Filed: May 27, 1992

[30] Foreign Application Priority Data

May 27, 1991 [KR] Rep. of Korea ............ 91-8611

[51] Int. Cl.$^6$ ............ H04N 1/23; H04N 1/46; H04N 5/225
[52] U.S. Cl. ............ 358/296; 358/518; 358/539; 358/909.1
[58] Field of Search ............ 358/296, 300, 444, 503, 358/505, 518, 520, 521, 523, 524, 530, 539, 909.1; 346/157; 341/50; 355/327; 395/115, 116

[56] References Cited

U.S. PATENT DOCUMENTS

| 4,908,701 | 3/1990 | Udagawa | 358/518 |
| 5,028,993 | 7/1991 | Kobori et al. | 358/524 |
| 5,115,320 | 5/1992 | Ebihara et al. | 358/296 |
| 5,128,771 | 7/1992 | Kwak | 358/296 |
| 5,181,105 | 1/1993 | Udagawa et al. | 358/518 |
| 5,216,514 | 6/1993 | Hong et al. | 358/296 |
| 5,291,313 | 3/1994 | Kim | 358/521 |

*Primary Examiner*—Peter S. Wong
*Assistant Examiner*—Eric Frahm
*Attorney, Agent, or Firm*—Robert E. Bushnell

[57] ABSTRACT

A high speed color video printer for printing video signals representative of color images including a data converter comprising an internal memory storing one frame of video data representative of color images in rows and columns, for reading and writing each column of video data stored in the internal memory into a single line memory during vertical synchronization and equalization pulse intervals in each field period and enabling printing each column of video data stored in the line memory during remaining intervals of each field period. With the use of the data converter, columns of video data for each field period can be read and printed much quicker than the currently available video printers. The high speed color printer also includes a video monitor capable of enabling visual display of video data sequentially read from the internal memory in rows during the remaining intervals of each field period when the stored column unit of video data is being printed.

38 Claims, 7 Drawing Sheets

HIGH SPEED COLOR VIDEO PRINTER FOR PRINTING COLOR IMAGE DATA IN SUCCESSIVE COLUMNS DURING BLANKING INTERVALS OF A VIDEO ROSTER SCAN

CROSS-REFERENCE TO RELATED APPLICATIONS

This application makes reference to, incorporates the same herein, and claims all benefits incurring under 35 USC §119 from an application for A High Speed Color Video Printer filed in the Korea Industrial Property Office on 27 May 1991 and assigned Ser. No. 1991/8611.

BACKGROUND OF THE INVENTION

1. Technical Field

The present invention relates to a color video printer and, more particularly, to processes and circuits for deriving from data representative of successive lines of a video raster scan, data representative of successive columns of video data extending transversely across lines of the raster scan, and to the printing of the columns of video data successively.

2. Background Art

Currently available video printers can print color image data in successive columns from a color video raster scan, however these printers are slow in operation. Moreover, currently available video printers typically require two line memories which add to the cost and size of the printers.

SUMMARY OF THE INVENTION

It is therefore an object of the present invention to provide an improved color video signal printer capable of high speed printing of color images.

It is also another object of the present invention to provide a high speed color video signal printer capable of printing color images using only one line memory.

To achieve these and other objects, the present invention contemplates a high speed color printer with a data converter comprising an internal memory storing one frame of video data representative of color images in rows and columns, for reading and writing each column of video data stored in the internal memory into a single line memory during vertical synchronization and equalization pulse intervals in each field period, and enabling printing each column of video data stored in the single line memory during remaining intervals of each field period. The high speed color printer is also capable of enabling visual display of video data during the remaining intervals of each field period when the stored column unit of video data is being printed. By using the data converter, columns of video data for each field period can be read and printed much quicker than the currently available video printers.

BRIEF DESCRIPTION OF THE DRAWINGS

A more complete appreciation of the invention, and many of the attendant advantages thereof, will be readily enjoyed as the same becomes better understood by reference to the following detailed description when considered in conjunction with the accompanying drawings which like numbers indicate the same or similar components, wherein.

DETAILED DESCRIPTION

Figure 1:
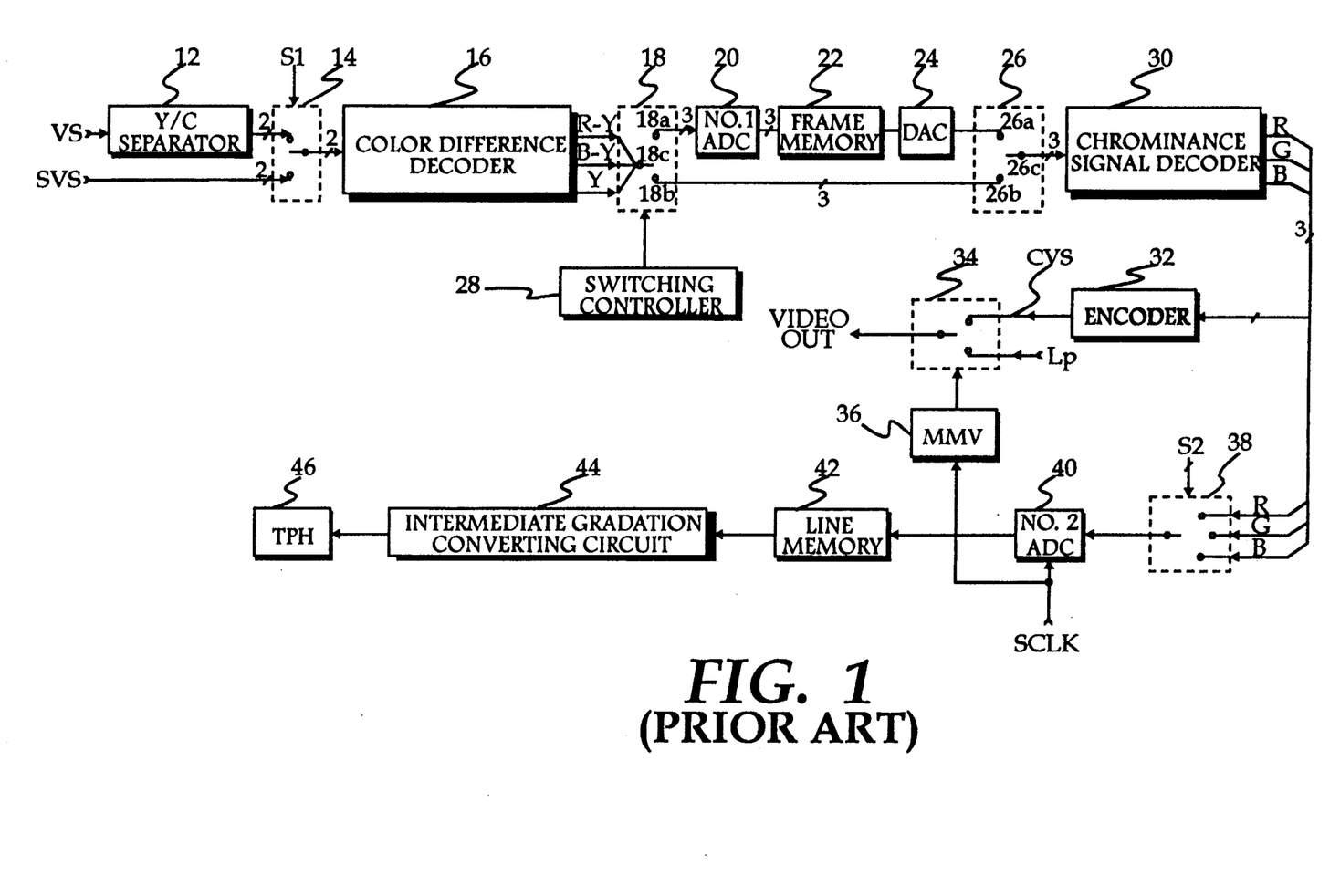
FIG. 1 is a block diagram of a conventional video color printer.

FIG. 1 illustrates a currently available color video printer. The conventional printer has a color difference decoding section comprising a luminance and chrominance (Y/C) separator 12, a switch 14, and a color difference decoder 16; a digital video data memory section comprising an analog-to distal (A/C) converter 20, a frame memory 22, a digital-to-analog (D/A) converter 24, a pair of switches 18, 26 and a switch controller 28 which controls the switches 18, 26; a video monitor signal output section comprising a chrominance signal decoder 30 which receives color difference signals provided from the digital video data memory section to produce corresponding chrominance signals, an encoder 32, switch 34, and a monostable multivibrator (MMV) 36; and a printer section comprising a switch 38, a second analog-to-digital (A/D) converter 40, a line memory 42, an intermediate gradation converting circuit 44, and a thermal print head (i.e., a "TPH") 46.

In use, video signals received from an external source are divided into luminance and chrominance signals by the Y/C separator 12. Switch 14 selects either the luminance and chrominance signals separated from the Y/C separator 12, or external super video signals (SVS) provided from an external source according to a selection signal S1 to provide an output to the color-difference decoder 16. Color-difference decoder 16 provides color-difference signals (R-Y, B-Y, Y) by decoding the luminance and the chrominance signals selected by switch 14. At this time, switches 18, 26 are connected to terminals 18c, 18b, 26b, 26c, respectively, under the control of the switch controller 28. Accordingly, when the terminals 18c, 18a, 26a, 26c of switches 18, 26 are connected under the control of the switch controller 28, the color-difference signals B-Y, R-Y, Y from the color-difference decoder 16 are convened to digital video data by the analog-to-digital (A/D) converter 20 and are subsequently stored in the frame memory 22 as one frame (i.e., 2-fields) of video data.

The video data stored in frame memory 22 is read by a control device and is provided to an input port of the digital-to-analog (D/A) converter 24 which converts the video data read from the frame memory 22 into analog signals and delivers the analog signals to the chrominance signal decoder 30. Chrominance signal decoder 30 decodes the analog signals to generate red, green, blue (R, G, B) color signals to the encoder 32 and the switch 38, respectively in the form of a video scan. Here, encoder 32 encodes and supplies the incoming R, G, B color signals as composite video signals (CVS) to a monitor (not shown) for a visual display.

Encoder 32 outputs, now transformed into composite video signals, are applied to a first input port of switch 34, which also receives pedestal level signals Lp at its second input port. Switch 34 is controlled by an output of the mono-multivibrator MMV 36 triggered by a predetermined period of a clock signal (SCLK) to selectively provide either the composite video signals CVS, or the pedestal level signals Lp to the monitor for a visual display. When video data of one frame is provided to the monitor, switch 38 selects and outputs the B-color signal of one frame to the A/D converter 40 under the control of the selection signal S2 for color printing.

During occurrence of a frame, the clock signal (SCLK) is applied to the A/D converter 40 for a first column (that is, the initial position) in each horizontal line. Accordingly, the B-color signal corresponding to a vertical line, or column, through the first picture point of each row in the frame, is converted into digital data and is stored in the line memory 42. Video data stored in the line memory 42 is then converted to yellow color by the intermediate gradation converting circuit 44, and is printed by a thermal print head 46. While the video data of one vertical line stored in the line memory 42 is being printed, the video data of a next frame is provided to the monitor through switch 34. While the video data of the next frame is being provided to the monitor, the A/D converter 40 samples the composite video signals of each horizontal line to assemble a second column of data under the control of the clock signal (SCLK). The digital data sampled by the A/D converter 40 is printed by the thermal print head TPH 46 as a second column, next to the first column, and further columns are thereafter printed in a similar manner for each of the following frames.

After approximately 500-600 columns of one frame of the B-color signal have been printed by this method, the G-color signal is selected by the selection signal S2 applied to switch 38, which is then printed in vertical columns by a similar process to thereby print the video images in the color of magenta. When the magenta color printing has been completed, the R-color signal is selected by the selection signal S2 applied to switch 38, and the cyan color is printed by a similar process. In this way, the three colors of Y (yellow), M (magenta) and C (cyan) are printed sequentially.

Figure 2:
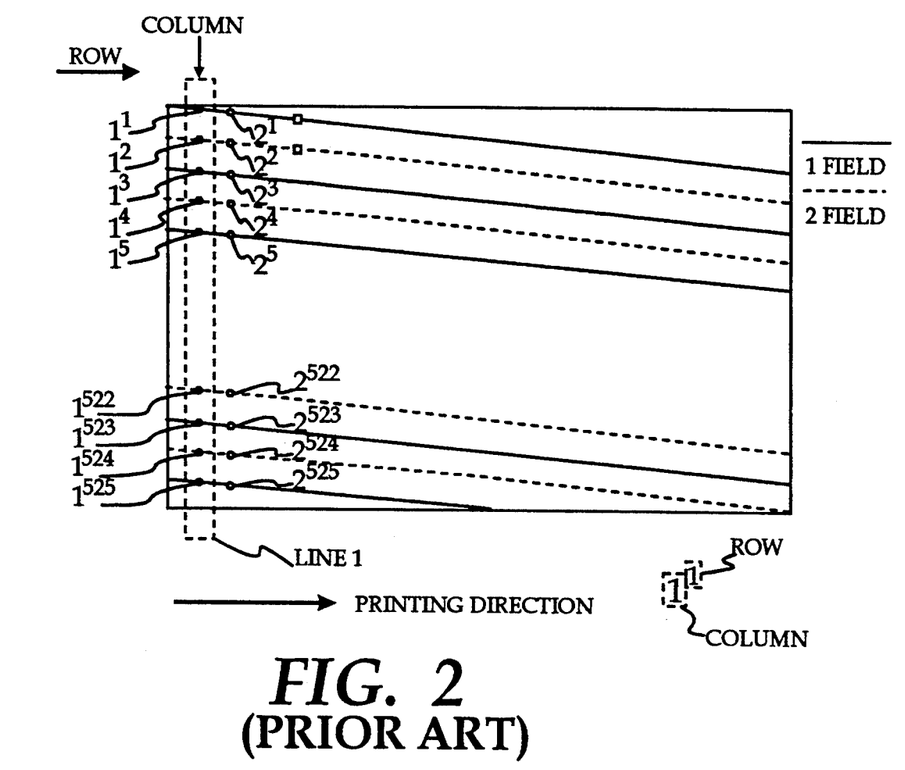
FIG. 2 illustrates the sampling process of one frame video signal at the analog-to-digital (A/D) converter 40 as shown in FIG. 1.

FIG. 2 illustrates the sampling of a frame of the video signal in accordance with the sampling clock signal (SCLK) applied to A/D converter 40 as shown in FIG. 1. One frame is composed of an odd field shown in a continuous line and an even field depicted as dotted line, which constitute one complete video display.

The R, G and B color signals are applied sequentially to the second A/D converter 40 via the switch 38 under the control of the selection signal S2. When video data of one screen (i.e., one frame) is displayed on a monitor, an initial sampling clock signal (SCLK) is used to select a first column forming a picture point of each horizontal line. Accordingly, the color signal selected by switch 38 is converted into digital data by the sampling clock signal (SCLK) with the first column being sampled. Thereafter, when the video data of the next frame is displayed on the monitor, the sampling clock signal (SCLK) applied to the second A/D converter 40 selects data for the second column.

By the same method as mentioned above, when approximately 500-600 vertical lines of the first color signal have been sampled, the next color signal is selected and sampled by the process as explained above. This way, the R, G, and B color signals of one frame is sampled in columns, and stored in line memory 42.

Figure 3A:
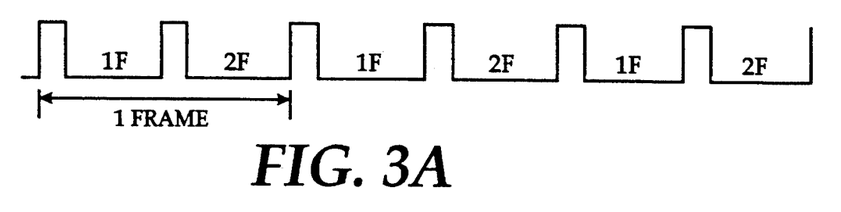
FIGS. 3A-3C illustrate a timing diagram of the data input-output for the line memory 42 shown in FIG. 1.
Figure 3B:
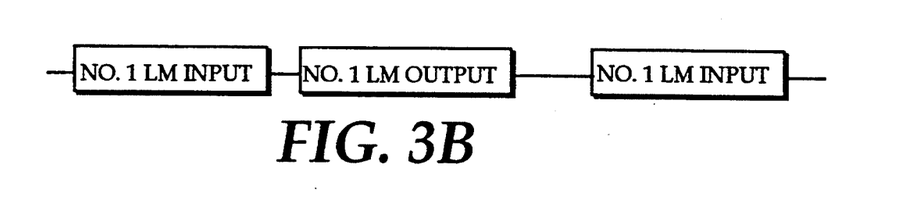
Figure 3C:
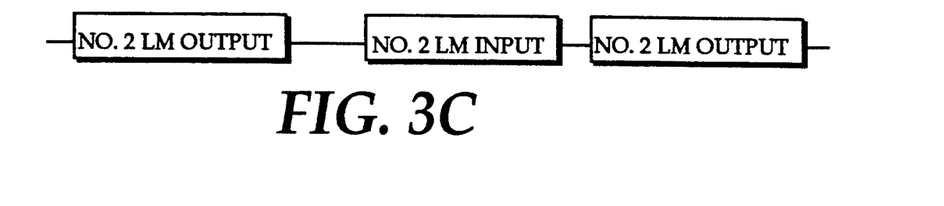

FIGS. 3A-3C illustrate a timing diagram of data input-output for the line memory 42 of the conventional color video printer shown in FIG. 1. In the conventional color video printer, two line memories are needed for printing of one frame video signal. In other words, when one frame of video signal comprising two fields, as is shown in FIG. 3A, is scanned, the first line memory receives that data as is illustrated in FIG. 3B. When data is written into the first line memory, the second line memory, as is shown in FIG. 3C, reads the data received during a previous frame period. Here, the data input either written into, or read from the two line memories during one frame period is column data as explained above. Likewise, when the second line memory receives column data during one frame period, the first line memory reads column data already received during a previous frame period and two line memories perform the input and output alternately.

As described above, conventional color video printers print one line during one screen (i.e., one frame) display period. The printing time, T1 for one color can be listed as follows:

$$T_1 = T_f \times 500\text{-}600 \text{ line} = 500T_f\text{-}600T_f = 16.5\text{-}19.8 \text{ (sec)} \quad (1)$$

Where $T_f$ a frame period encompassing 1/30 seconds (33 msec). Therefore, the total printing time Tt for 3 colors representative of the K, G and B color signals can be listed as below:

$$T_t = 3T_1 = 3[16.5\text{-}19.8(\text{sec})] = = 49.5\text{-}59.4 \text{ (sec)} \quad (2)$$

As seen in the foregoing explanation, in addition to using two line memories for color printing, the conventional color video printers also undesirably consume approximately 50-60 seconds to print one multi-colored video frame.

Figure 4:
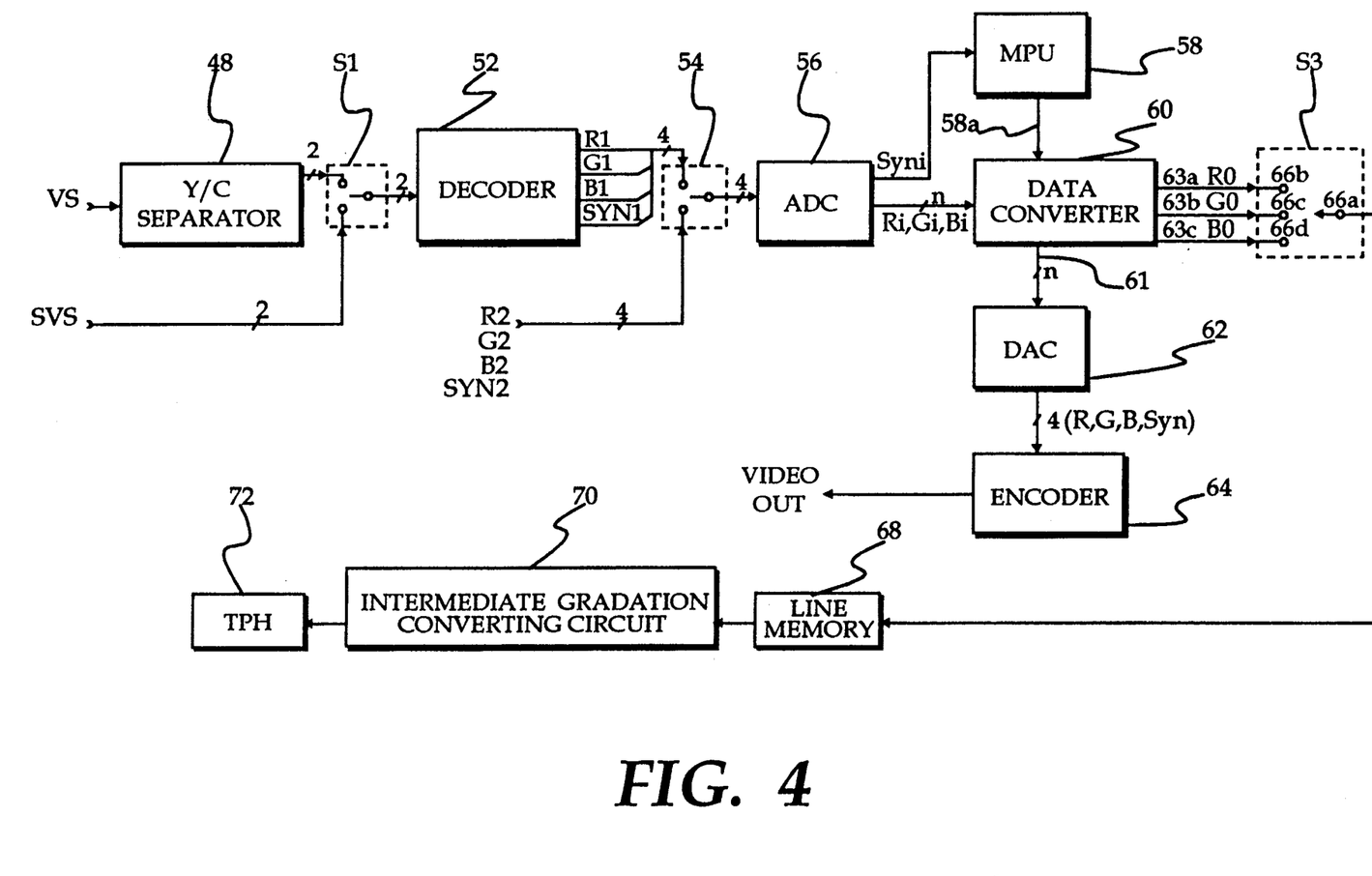
FIG. 4 is a block diagram showing a high speed color video printer constructed in accordance with the present invention.

FIG. 4 is a block diagram of a high speed video color printer constructed in accordance with the principles of the present invention. In FIG. 4, luminance-chrominance (Y/C) separator 48 receives and separates the composite video signals VS into luminance and chrominance signals. Switch 50 selectively outputs either the luminance and chrominance signals provided from the Y/C separator 48, or the luminance and chrominance signals of a super video signal SVS provided from an external source under the control of the selection signal S1. Decoder 52 decodes the luminance and chrominance signals provided from the switch 50 to provide a first set of R1, G1, B1 and the synchronization signal SYN. Switch 54 selectively outputs the first set of R1, G1 and B1 color signals and the synchronization signal SYN1 provided form the decoder 52, or a second set of R2, G2 and B2 color signals and a synchronization signal SYN2 provided from an external source under control of a selection signal S2. Analog-to-digital (A/D) converter 56 converts the signals provided from switch 54 into Ri, Gi, and Bi digital signal color data and synchronization data.

MPU microprocessor 58 then generates the selection signals S1, S2, S3 according to the user's input selection to control the switching operation of the switches 50, 54 and 66. Data converter 60 which includes an internal memory for storing the Ri, Gi, Bi, digital color data under the control of the MPU 58 and outputting video data in columns at output ports 63a, 63b, 63c, for enabling printing during the line blanking interval of a field period, and outputting the video data on a field-by-field basis to a display output port 61. Digital-to-analog (D/A) converter 62 converts video data output on a field-by-field basis from the display output port 61 of the data converter 60 into analog signals. Encoder 64 then encodes the output analog signals provided from the D/A converter 62 into composite video signals to be displayed on a video monitor (not shown). Switch 66 selectively outputs signals representative of one color from print output ports 63a, 63b, 63c of the data converter 60 under the control of a selection signal S3 provided from the MPU 58. A column line memory 68 stores one color of video data selected by switch 66, and then enables the thermal print head (TPH) 72 to print output video data during a residual period of each field period minus a period which stores video data for one field period. Intermediate gradation converter 70 converts as an intermediate gradation, the data from the line memory 68. TPH 72 is a printing device which prints the output of intermediate gradation converter 70.

Consequently, when the video signals VS shown in FIG. 4 is received, Y/C separator 48 separates the video signals VS into the luminance and chrominance signals. Switch 50 selectively provides luminance and chrominance signals separated by the Y/C separator 48, or the luminance and chrominance signals of the super video signals SVS provided from an external source according to the selection signal S1. Decoder 52 outputs the luminance and chrominance signals received from switch 50. Switch 54 selectively provides either R1, G1, B1 color signals and a synchronization signal SYN1 from the decoder 52, or external R2, G2, B2 color signals and a synchronization signal SYN2 according to the selection signal S2. A/D converter 56 converts the color signals and the synchronization signal provided from the switch 54 into color digital signals Ri, Gi and Bi and synchronization digital signal SYNi. The digitized data Ri, Gi, Bi provided from the A/D converter 56 are applied to the data converter 60.

When the user selects a print mode, MPU 58 is synchronized with a vertical synchronization signal SYNi of the incoming video signals and outputs a recording mode signal on line 58a for one frame period. The data converter 60 produces recording addresses by way of the recording mode signal, and the data corresponding to the recording addresses are recorded into the internal memory for the three colors red, green and blue, respectively. When red, green and blue data Ri, Gi, Bi for one frame are stored into the internal memory of the data converter 60, MPU 58 outputs a print mode signal on line 58a during the usual vertical blanking periods. MPU 58 activates the internal memory of the data converter 60 in order to read out data to be printed (as will be explained in more detail hereinafter), and inputs a write signal to the line memory 68.

Now, the data converter 60, in response to the print mode signal, generates and applies printing addresses to its internal memory to address data to be printed on a column by column basis. Thus, the data converter 60 generates printing addresses for data comprising the first column (from the first line to the last line by the first row) in the internal memory during the vertical synchronization 3H and equalization pulse 3H period of the blanking interval for the first field period. Then, the data converter 60 produces the printing addresses for the data forming the second column, during the vertical synchronization 3H and equalization pulse 3H period of the blanking interval for the second field period. Thereafter, the data converter 60 generates the printing addresses for the third, fourth ... through the 512th column, so that the data can be addressed in the internal memory.

Therefore, 512 pieces of picture element data of the first vertical line (or column) stored respectively in red, green and blue in the internal memory of the data converter 60, are read and provided to print output ports during a 6H period (about 381 μsec). The access time for each picture element is as follows:

$$6H/512 \text{ row} = \text{about } 740 \text{ nanoseconds.} \qquad (3)$$

One vertical line data of red, green and blue Ro, Go, Bo from each internal memory of data converter 60 is fed to the respective terminals 66b, 66c, 66d of switch 66.

Terminal 66a of switch 66 is connected initially to terminal 66d under control of the selection signal S3, resulting in only the blue data Bo read from the internal memory of the data converter 60 being provided to the line memory 68.

The data recorded in line memory 68, after the elapse of a 6H period, is read during one field period (16.7 msec) minus the 6H period (about 381 μsec) (i.e., 16.7 msec−381 μsec=16.319 msec), and is provided to the intermediate gradation converter 70. The intermediate gradation converter 70 then converts the print data by way of intermediate gradation, and applies the converted data to TPH 72 to enable multi-colored printing. Accordingly, one vertical line (or column) of data for one frame is printed during 16.319 milliseconds.

Thereafter, MPU 58 outputs a control signal on line 58a after a period of 6H (which is the vertical synchronization and equalization pulse period), and controls the data converter 60 to operate in a monitoring mode in order to feed video data to the monitor for a visual display.

When operated in the monitoring mode, the data converter 60 produces monitoring addresses for the internal memory to produce addresses for conventional interlaced raster scans and to enable the reading of data in odd and even fields from the internal memory. Sequentially, odd rows are read first from the internal memory, and then even rows are read. In response to the monitoring of addresses, the data converter 60 first outputs to the display output port 61, an odd field of data during the field period that remains after the video data has been output to the print output ports 63a, 63b, 63c in one field period and then, outputs to the display output port 61 the data for the even field.

Red, green and blue data provided to the display output port 61 of data converter 60 are converted into analog signals by the D/A converter 62. Red, green and blue data converted into analog signals are encoded into composite video signals by the encoder 64, and then are displayed on the monitor; this causes one frame of video signal as being printed to also be displayed. After the frame of video signal has been displayed on the monitor, and when the vertical synchronization signal is received, MPU 58, as mentioned above, provides a control signal to line 58a, to enable the data converter 60 to operate in a print mode. Then the data converter 60 designates the second column of the internal memory and generates appropriate addresses. In effect, the data converter 60 produces addresses reading from the first row up to the 512th row of the second column during the 6H (381 μsec) period of the blanking signal interval in the two-field period. Consequently, vertical line data for the second column is read out of the respective internal memory of the data converter 60.

Then, switch 66 having terminal 66a connected terminal 66d, transmits the second vertical line of data to the line memory 68, and the second vertical line of data is then stored in line memory 68. The stored data of the line memory 68 is, as mentioned above, transmitted to thermal print head TPH 72 through the intermediate gradation converter 70 and is printed for about 16 msec. Accordingly, the vertical line data is read during the 6H period of each field (262.5H) from the internal memory of the data converter 60 which stores the blue color data, and is applied to print output ports 63a, 63b, 63c and printed during the 262.5H–6H period (16.3 msec).

In other words, all of the vertical line (513 lines) data for blue color (B) stored in the internal memory of the data converter 60 are transmitted to the line memory 68 through switch 66 for 8.3 seconds which equals a "16.3 msec×512 lines" period, and then is printed. When all the vertical line data for the blue color stored in the internal memory of the data converter 60 has been transmitted to the line memory and printed, the terminal 66a of switch 66 is connected to terminal 66c under control of the MPU 58. When switch 66 is operated, MPU 58, by repeating the same operation as mentioned above, outputs vertical line data per each field from the internal memory of data converter 60 wherein green color data is stored, and then prints the green color data by transmitting it to the line memory 68 for 8.3 seconds.

When the transmission of the green color data is completed, terminal 66a of switch 66 is connected to terminal 66b by MPU 58, and by repeating the same operation as mentioned above, red color data recorded in the internal memory of the data converter 60 is transmitted to the line memory 68, column by column. Therefore, assuming the total printing time $T_o$ for red, green and blue R, G, B color data stored in each internal memory of data converter 60 is $T_o$, the following formula for $T_o$ reads as follows:

$$T_o = 16.7 \text{ msec} \times 512 \times 3 \text{ colors (R, G, B) } 25.6 \text{ sec.} \quad (4)$$

One field period of 16.7 msec in the above formula is needed for scanning 262.5H. A 6H period of the 16.7 msec total printing time $T_o$ is the data read time for the vertical 20 line data and an approximately 16.319 msec period represents the period wherein the vertical line data is printed.

As described above, the present invention can print color video images at a high speed, wherein one frame of video data is stored in the internal memory of a data converter 60, the frame data is stored in the internal memory of the data converter 60 and transmitted to a line memory at a rate of one column per field period and then printed, and one screen of video signal is visually displayed on a monitor during the printing operation.

Figure 5:
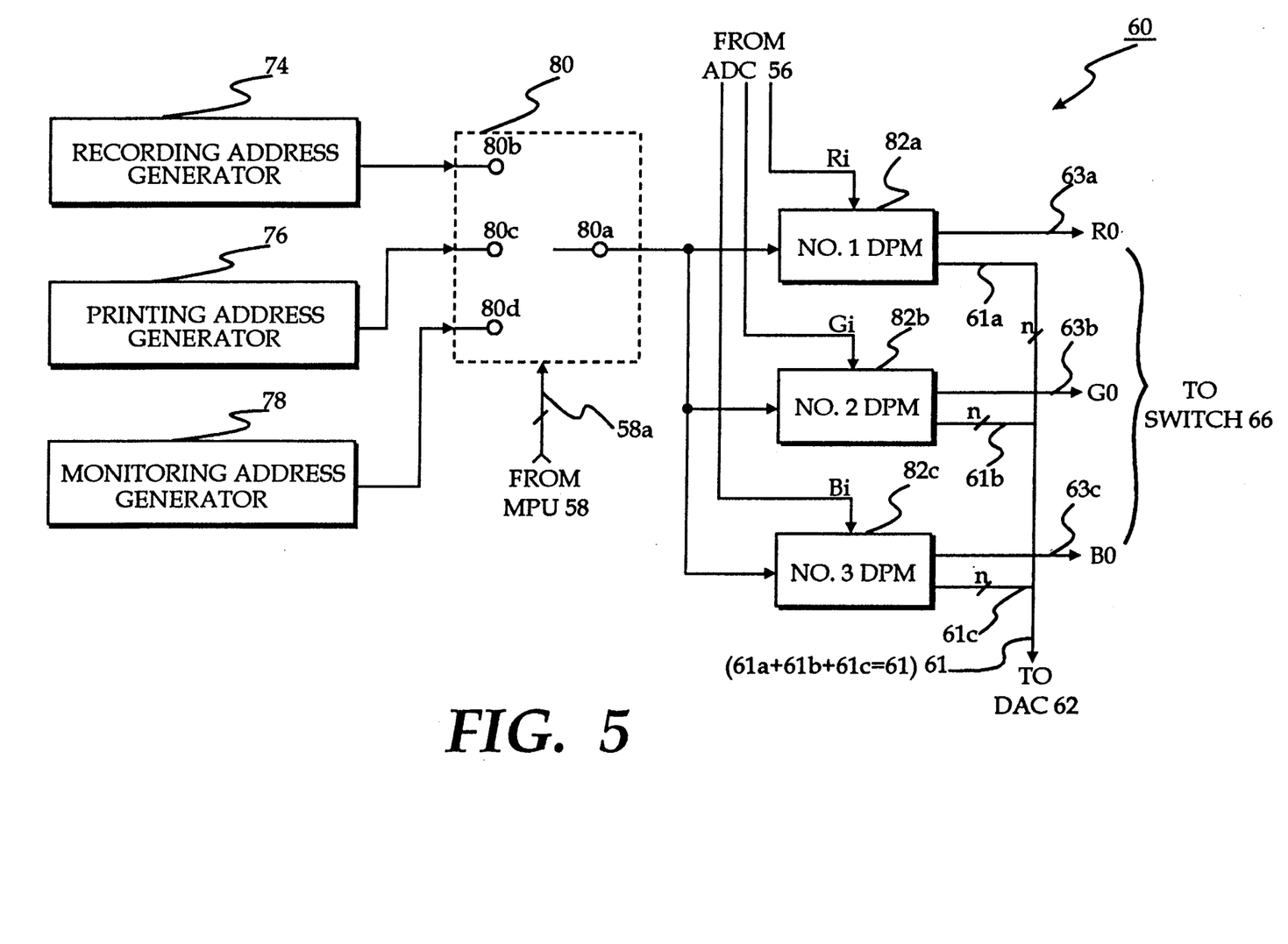
FIG. 5 illustrates one preferred embodiment of the data converter 60 shown in FIG. 4.

FIG. 5 illustrates one preferred embodiment of the data converter 60 shown in FIG. 4. Recording address generator 74 produces sequentially the addresses for recording one frame of video data in the internal memory. Printing address generator 76 designates one column where the video data 20 is stored, by way of a method which designates sequentially the designated columns and sequential addresses of data locations within a designated column. Monitoring address generator 78 generates sequential addresses to read a field of data from the internal memory, to be output sequentially through the display output port 61. Address selector 80 is controlled by MPU 58 to select the addresses generated by the recording address generator 74, the printing address generator 76, or the monitoring address generator 78. No. 1, 2, 3 dual-port-memories DPM 82a, 82b and 82c receive the addresses from the recording, printing and monitoring address generators 74, 76 or 78 selected by the address selector 80, and store the digital color signals R1, G1, B1 received from the A/D converter 56, or output the stored color signal data. No. 1, 2, and 3 dual-port memories 82a, 82b, 82c respectively have print output ports 63a, 63b, 63c, and a display output port 61. The display output ports 61a, 61b, 61c of the three dual-output memories 82a, 82b, 82c are connected via line 61 to the D/A converter 62 to be displayed on the monitor after being converted from digital video signals into analog video signals, and the print output ports 63a, 63b, 63c are respectively connected to the switching terminals 66b, 66c, 66d of switch 66. Accordingly, digital color data Ri, Gi, Bi provided from the A/D converter 56 is respectively applied to the input terminals of No. 1, 2, 3 dual-port memories 82a, 82b, 82c. When the recording mode is selected, MPU 58 is synchronized to the vertical synchronization signal of the input video signal, and applies a recording mode signal to line 58a during one frame period. When the recording mode signal provided from MPU 58 is supplied to the address selector 80 through line 58a, the address selector 80 is toggled and terminal 80a is connected to terminal 80b. When the terminals 80a and 80b of the address selector 80 are connected, the recording address generated by recording address generator 74 is supplied to the dual-port memories 82a, 82b, 82c in order to enable the dual-port memories 82a, 82b 82c to record the Ri, Gi, Bi color data according to the recording addresses in its internal memory cells. The recording addresses generated by the recording address generator 74 are used to align the pixel position of the monitor with the same placement position to be stored in the No. 1, 2, and 3 dual-port memories 82a, 82b, 82c.

As described above, when the user selects the print mode under the condition that one frame each of red, green, blue color data Ri, Gi, Bi is stored in No. 1, 2, 3 dual-port memories 82a, 82b, 82c respectively, MPU 58 generates a print mode signal via line 58a during the 6H interval corresponding to the vertical synchronization and equalization pulse period. Then, the print output ports 63a, 63b, 63c of No. 1, 2, 3 dual-port memories 82a, 82b, 82c are selectively controlled by the selection signal S3 applied to switch 66 so as to enable data stored in the dual-port memories 82a, 82b, 82c to be selectively transmitted to the line memory 68 for printing. The printing addresses generated from the printing address generator 76 are used to designate one column of data stored in the dual-port memories 82a, 82b, 82c during the first vertical 3H and equalization pulse 3H interval (from the first row to the last row in the first column), and the designated data is sequentially output at the switch 66 to define the first column of data. Switch 66 initially outputs only blue color data to the line memory 68 during the 6H interval, and tile memory 68 outputs the first column data of blue color data during a period not including the 6H interval in one field period to the TPH 72 for color printing.

Thereafter, MPU 58 supplies a monitoring mode signal to the address selector 80 through line 58a when the 6H interval corresponding to the vertical synchronization and equalization pulse period is expired. When the monitoring mode signal is input, the address selector 80 is switched so that the terminals 80a and 80d are connected, and the monitoring addresses generated by the monitoring address generator 78 are written into No. 1, 2, 3 dual-port memories 82a, 82b, 82c. At this moment, addresses generated by monitoring address generator 78 are normal addresses which read odd and even fields of data from No. 1, 2, 3 dual-port memories 82a, 82b, 82c. First, odd fields of data among the data recorded in No. 1, 2, 3 dual-port memories 82a, 82b, 82c are applied to the D/A converter 62 through the display output port 61, and then even fields of data are applied. Red, green, and blue color data output to display output port 61 of No. 1, 2, 3 dual-port memories 82a, 82b, 82c of the data convertor 60, are converted into analog signals by the D/A converter 62. Red, green, and blue color data converted into analog signals are then encoded to provide composite video signals which are applied to a monitor for a visual display. Thus, one frame of the video signal now being printed is simultaneously displayed on the monitor. As mentioned above, after the video image is displayed on a monitor, and then, after a vertical synchronization signal is received, MPU 58 inputs printing mode signals to address selector 80 through line 58a. Terminals 80a and 80c of address selector 80, as described above are connected in response to the printing mode signal. Then, the printing address generator 76 sequentially generates address signals for the second column, starting in the first-row, and moving sequentially up to the 512th row. In other words, by reading addresses from the first row through to the 512th row for the second column during the 6H interval of 381 microseconds, data for the second column is generated. Accordingly, data for the second column is read from No. 1, 2, and 3 dual-port memories 82a, 82b, 82c, respectively, and then provided to the print output ports 63a, 63b, 63c.

The second column of data is read during the 6H interval. At this moment, switch 66 outputs only blue color data to the line memory 68 during the 6H interval, and the line memory outputs the second column of blue color data during a period which excludes the 6H interval during one field period in order to perform printing. Accordingly, each vertical line data in No. 3 dual-port memory 82c is read for each 6H interval of each field of 262.5H and is printed during a 262.5H-6H interval; that is, during 16.3 milliseconds.

When printing of blue color data stored in No. 3 dual-port memory 82c is completed, terminals 66a and 66c in switch 66 are connected under control of the selection signal S3 provided from the MPU 58. When terminals 66a and 66c are connected, MPU 58 repeats the same operations as mentioned above, and transmits column data stored in No. 2 dual-port memory 82b to line memory 68 for each field, and prints green color data. When the transmission of data stored in No. 2 dual-port memory 82b is completed, MPU 58 connects terminals 66a and 66b in switch 66, repeats the same operation, and transmits red color data stored in No. 1 dual-port memory 82a to line memory 68 to print of red color data.

Assuming that the total print time for R, G, B color data stored respectively in No. 1, 2, and 3 dual-port memories 82a, 82b, 82c is $T_o$, then:

$$T_o 16.7 \text{ msec} \times 512 \times 3 \text{ colors (R, G, B)} = 25.6 \text{ sec.} \tag{5}$$

In the above equation, 16.7 msec is the field frequency cycle of a scanning period of 262.5H and a read time for vertical line data during a 6H interval within the 16.7 msec cycle, while an approximately 16.319 msec period, which is a 16.7 msec - 6H period corresponding to the time when vertical line data is printed.

Figure 6:
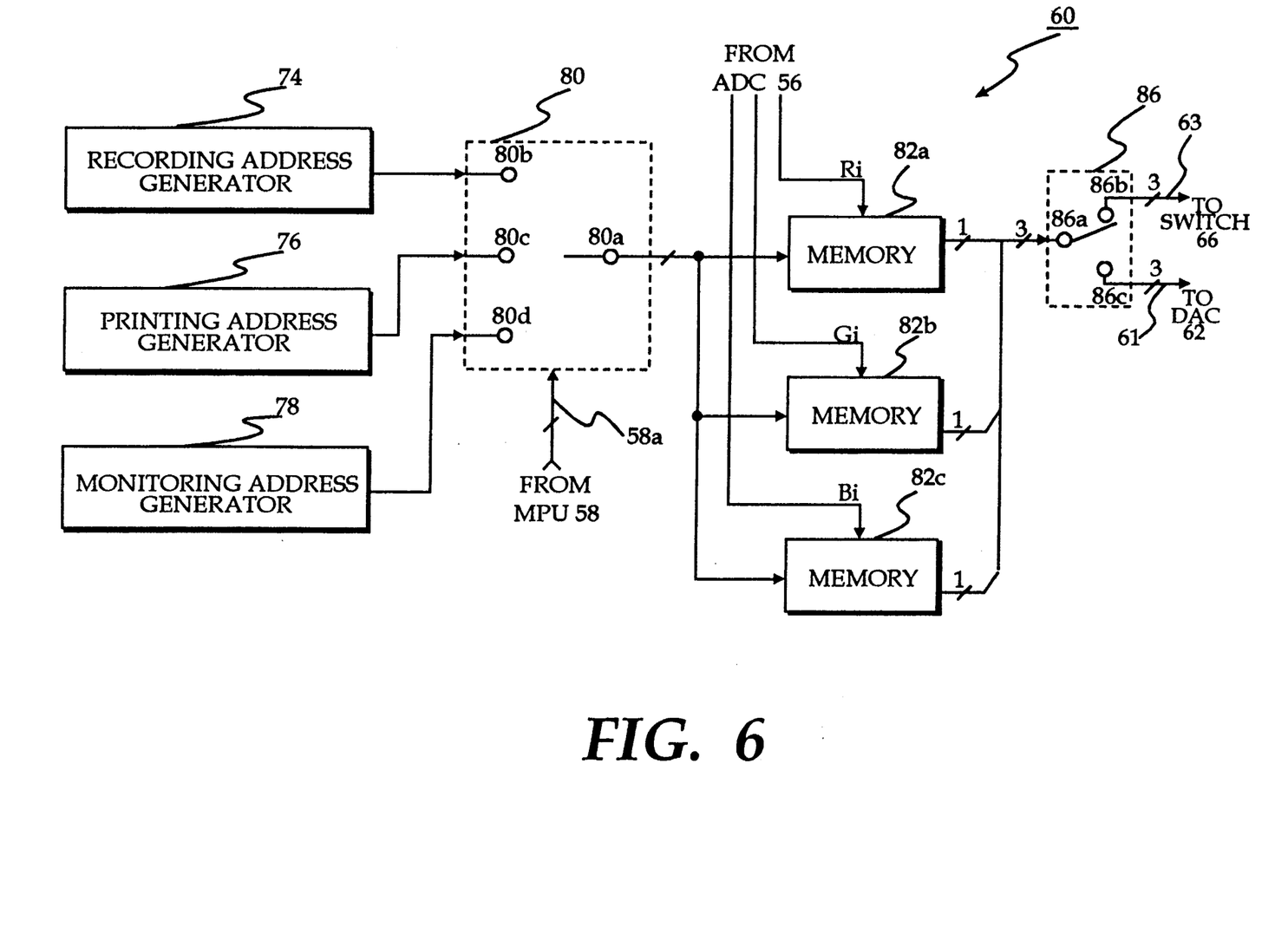
FIG. 6 illustrates another preferred embodiment of the data converter 60 shown in FIG. 4.

FIG. 6 illustrates another preferred embodiment of the data converter 60 shown in FIG. 4. The data converter 60 shown in FIG. 6 uses a print output port, similar to that of FIG. 5, memories 88a, 88b, 88c, however has only one output port, thereby eliminating the use of No. 1, 2, 3 dual-port memories 82a, 82b, 82c and their associated display output ports. Data converter 60 also includes switch 86 having a print output port 63 and a display output port 61. Switch 86 is connected to the output ports of memories 88a, 88b, 88c. Therefore, data read from memories 88a, 88b, 88c output to one output port, is selected by switch 86 and output either to switch 66 or to the D/A converter 62.

The operation of recording, printing and monitoring address generators 74, 76, 78, and the operation of address selector 80 which selectively outputs addresses generated by address generators 74, 76, and 78, are controlled by MPU 58 and, are essentially the same as explained in conjunction with the data converter of FIG. 5. The principal operating difference is that terminals 86a and 86b in switch 86 are connected during a 6H interval which is the vertical synchronization and equalization pulse period of a blanking signal, and terminals 88a and 88c are connected during other periods. Accordingly, memory means 88a, 88b, 88c are connected to switch 66 during a 6H interval in one field and the data stored in memories 88a, 88b, 88c are read and output via switch 66.

Switch 66 reads one color of chrominance signal data from the data generated during the 6H interval in one field, and outputs that one color data to line memory 68, thereby enabling printing after the 6H interval. Terminals 86a and 86c of switch 86 are connected under the control of the MPU 58 at the end of the 6H interval, and video signals are output for a visual display on the monitor screen by transmitting odd and even fields of data in sequentially read memories 88a, 88b, 88c to the D/A converter 62.

Figure 7:
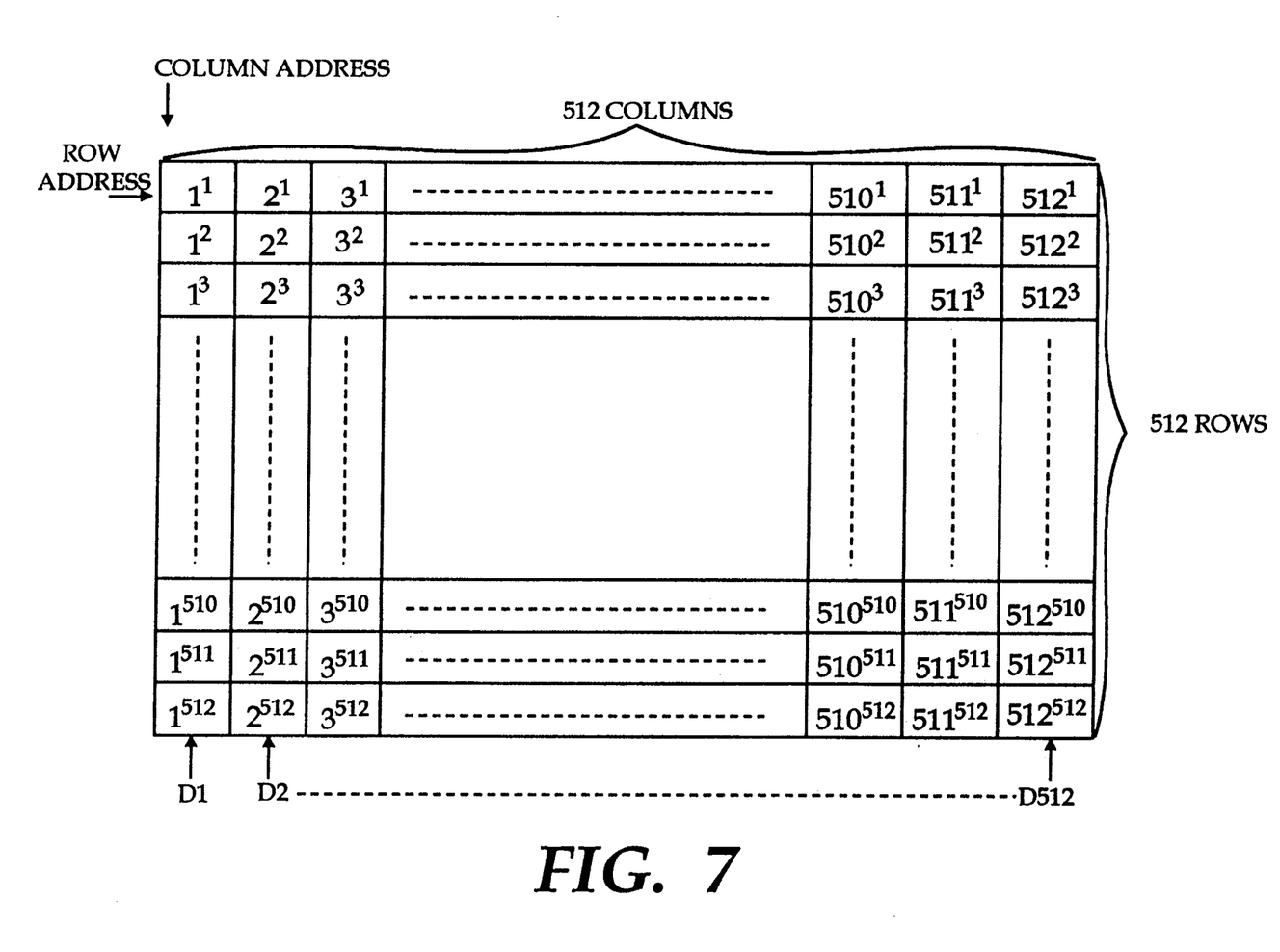
FIG. 7 illustrates a layout of each memory shown in FIGS. 5 and 6.

FIG. 7 illustrates a layout of one of the memories 88a, 88b, 88c shown in FIG. 6 or one of the dual-port memories 82a, 82b, 82c shown in FIG. 5. The layout has a data storage cell configuration in a corresponding 1:1 relationship to a pixel screen display (not shown). Here, the first row represents the first horizontal line, while the first column is the data of the first pixel for each line.

Accordingly, the data received from the A/D converter 56 to be stored in any one of the memories 88a, 88b, 88c shown in FIG. 6, or any one of the dual port memories 82a, 82b, 82c shown in FIG. 5 in accordance with recording addresses generated from the recording address generator 74 shown in FIG. 5, as depicted in FIG. 7, are recorded in the internal memory cell with the same position as the pixel position on the visual display screen of a monitor. For instance, data of $1^1, 2^1, 3^1, 4^1, \ldots, 512^1$, in a screen is stored in the first row domain of the memory layout, and on the second row domain, data of $1^2, 2^2, 3^2, 4^2, \ldots, 512^2$ is stored.

In the foregoing explanation, the base number represents the position of rows while the exponent of the base number represents the column position. Therefore, when changed to recording mode, Ri, Gi, Bi color data is stored in the memory layout of FIG. 7 in an arrangement with each address having a corresponding relation to screen pixel position of the visual display.

When a print mode is selected for a frame of red, green or blue color, data Ri, Gi, Bi is stored in a respective memory, and a vertical one-line of data $D_1$ is read in $1^1, 1^2, 1^3, 1^4, \ldots 1^{512}$ order by the printing address generated during the 6H interval corresponding to the vertical synchronization and equalization pulse period.

At this moment, 512 pieces of pixel data $D_1$ from a first vertical line of the line memory 68 are read during the 6H interval of approximately 381 μsec. Therefore, the access time per pixel is approximately 740 nsec (6H/512 rows=740 nsec, where 6H is approximately 381 μsec.) Afterwards, pixel data $D_2$ from the second vertical line memory is read in $2^1, 2^2, 2^3, 2^4 \ldots 2^{512}$ order during a second 6H interval that is the next vertical synchronization and equalization pulse period. In this way, the data $D_3, D_4 \ldots D_{512}$ of the vertical 3rd, 4th . . . and 512th lines is read. Meanwhile, the data recorded in memory is read by the monitoring addresses generated by the monitoring address generator 78, with odd field data read out of respective memory cells first and then even field data read. In other words, after the first row data of the $1^2, 2^2, 3^1, 4^1 \ldots 512^1$ cells, the third row data of the $1^3, 2^3, 3^3, 4^3 \ldots 512^3$ cells and other odd field data of 5th, 7th, 9th . . . 512th rows recorded in respective memory cell rows are read, then the second row data of the $1^2, 2^2, 3^2, 4^2 \ldots 512^2$ cells, the fourth row data of the $1^4, 2^4, 3^4, 4^4 \ldots 512^4$ cells, and other even field data of the 6th, 8th, 10th . . . and 512th rows of cells are read to the parallel ports.

As noted above, when the odd and even field data is read from respective memory cells where red, green, and blue data is stored and is sequentially output, the one frame of video signal currently being printed is also being displayed.

FIG. 8 provides in the patterns of waveforms (A), (B), (C), (D) and (E), a timing diagram explaining the operation of the circuit sections shown in FIGS. 4, 5, and 6. The pattern of FIG. 8(A) is a timing diagram of a composite video signal, namely a timing diagram showing a composite video signal for one field. Accordingly, one field of a composite video signal covers 262.5H and includes a blanking signal 20H and video signals 262.5H–20H. A blanking signal of 20H in turn, includes an equalization pulse of 5H or 6H (in order to distinguish odd fields from even fields, a distinction of 5H and 6H is given), and 3H of vertical synchronization pulses.

Figure 8A:
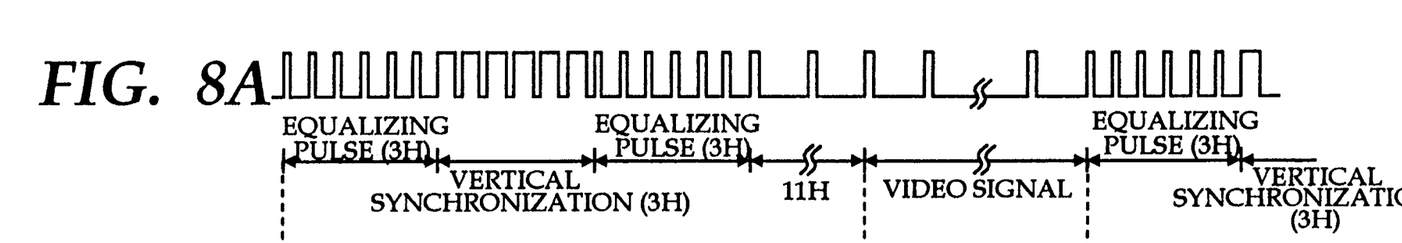
FIG. 8 illustrates a timing diagram of the printing operation of the high speed color printer of the present invention as shown in FIGS. 4, 5 and 6.
Figure 8B:
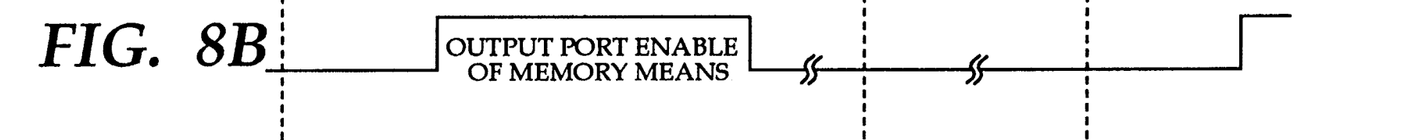

The pattern of FIG. 8(B) illustrates a timing diagram of a data output enable pulse for either memories 82a, 82b, and 82c, or 88a, 88b, 88c, wherein the output port of memories 82a, 82b, 82c, or 88a, 88b, 88c, connected to switch 66 is enabled during the 6H interval corresponding to the vertical synchronization and equalization pulse period.

One color of one vertical line (i.e., one column) of data of blue, green or red is output through switch 66 during the 6H period (63.5×6=381 μsec) during which the output port of memories 82a, 82b, 82c, or 88a, 88b, 88c, has been enabled. Since 512 pieces of pixel data $D_1$ for the first vertical line of memories 82a, 82b, 82c, or 88a, 88b, 88c, are read during the 6H period of approximately 381 μsec, an access time per pixel is approximately 740 nano-seconds. In other words, $$6H/512 \text{ rows} = 740 \text{ nsec}, \tag{6}$$

where 6H equals about 381 μsec.

Figure 8C:
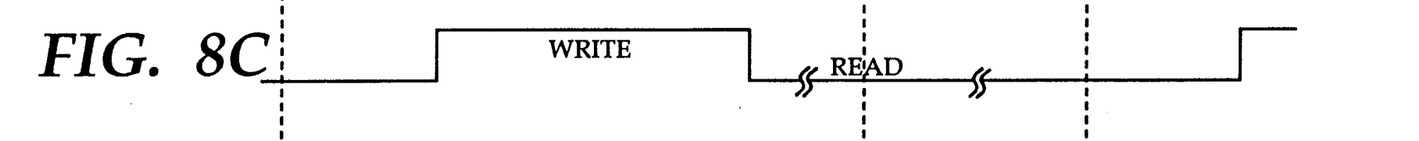

The pattern of FIG. 8C is a timing diagram for a write/read enable pulse of line memory 68. As described in conjunction with the discussion of the pattern of FIG. 8(B), line memory 68 stores chrominance signal data of a column of data (one color of one vertical line) which is input through switch 66 during a 6H period; the particular color depends upon which output port of memories 82a, 82b, 82c, or 88a, 88b, 88c, is enabled. After the 6H period, line memory 68 reads the chrominance digital data for the stored column during a period of:

$$262.5H - 6H = 256.5H \tag{7}$$

$$(16.7 \text{ msec} - 381 \text{ μsec} = 16.319 \text{ msec}). \tag{8}$$

Figure 8D:
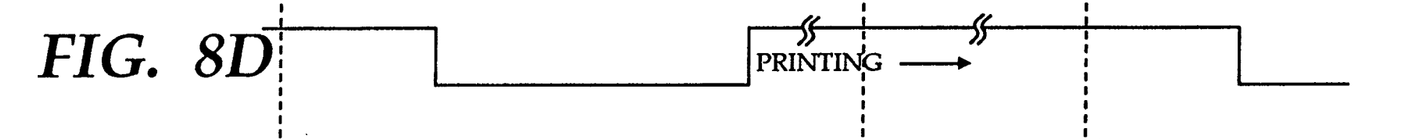

The pattern of FIG. 8(D) provides a timing diagram of the printing period. More precisely, a timing diagram for the printing period of one color of one vertical line or column of the red, green or blue colors. As noted in FIG. 8(C), a column of chrominance signal data read from line memory means 68 is read during a period of 262.5H−6H=256.5H, where (16.7 msec−381 μsec=16.319 ms) and is printed by thermal print head TPH 72 through the intermediate gradation converter 70. In this way, one column of frame data is printed during 16.319 milliseconds.

Figure 8E:
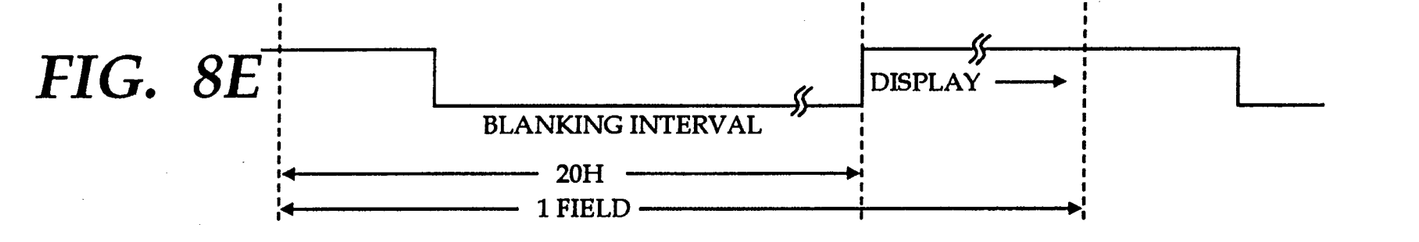

The pattern of FIG. 8(E) provides a timing diagram showing a monitoring enable period, and more precisely, a timing diagram illustrating a period for displaying one frame (i.e., one screen) of video data.

As was noted in the discussion of FIGS. 8C and 8(D), one frame of video data is displayed whilst being printed, i.e., during a period when column data in the line memory 68 is read and printed. In other words, the data for the red, green and blue colors is output in parallel to the D/A converter 62 and is converted into analog signals. This parallel analog data is encoded by encoder 64 as composite video signals and is output to the monitor so that one frame of video data currently being printed can also be displayed.

As explained in the discussion of FIG. 8, as one color of column data is printed during one field period of 16.7 ms, and if three colors having 512 columns respectively are to be printed, the total time $T_o$ for printing becomes:

$$T_o = 16.7 \text{ ms} \times 512 \times 3 \text{ colors (R, G, B)} = 25.6 \text{ seconds.} \tag{9}$$

As was explained in the foregoing paragraphs, the described embodiment of a video printer constructed according to the principles of the present invention can print color video images at a high speed by reading video data stored in memory during a 6H interval in one field corresponding to a vertical synchronization and equalization pulse period, storing the video data in a line memory, and reading and printing the video data stored in line memory during the remainder of the field period (which excludes the vertical synchronization and equalization pulse 6H period) within a shortened printing time.

I claim:

1. A video printer, comprising:

data conversion means responsive to first data representative of successive lines of a video raster scan, for deriving second data representative of successive columns of video data extending transversely across lines of said video raster scan from said first data, said data conversion means comprising memory means for storing said first data at every vertical line for each color, and means for converting said first data stored in said memory means for successive fields of said video raster scan into columns of said second data during respective successive field periods of said video raster scan; and means for printing the columns of said second data successively.

2. A video printer according to claim 1, wherein said successive field periods of said video raster scan comprise respective blanking periods, and said first data are read from said memory means for conversion into the columns of said second data during corresponding successive ones of said blanking periods.

3. A video printer according to claim 1, further comprising:

video output means for receiving said second data of the video raster scan read from said a memory means; and monitoring address generating means for addressing the memory means to produce said video raster scan for said video output means.

4. A video printer according to claim 1, wherein said memory means comprises a plurality of memory units for storing said first data in a different color for each field of said video raster scan.

5. A video printer according to claim 4, wherein said printing means prints different colors of said second data sequentially.

6. A video printer according to claim 1, further comprising printing address generating means for supplying address signals to the memory means to derive each said column of second data successively.

7. A video printer according to claim 1, further comprising recording address generating means for generating storage addresses in the memory means for storing said first data representative of said video raster scan.

8. A video printer according to claim 5, wherein each color representing said second data for each field of said video raster scan stored in said memory means is printed during a blanking period in a respective field period of said video raster scan.

9. A high speed color video printer, comprising:

means for storing digital video signals in an internal memory as video data, reading a column unit of said video data stored in said internal memory during a synchronizing and equalizing pulse period within a blanking interval of a field period, and applying a field unit of said video data for a visual display providing a variable visual image during a remainder of said field period that excludes said blanking interval;

selection means for selectively providing one color of said video data from said column unit of said video data read from said internal memory during said synchronizing and equalizing pulse period;

line memory means for storing said one color of said video data from said column unit of said video data provided from said selection means during said synchronizing and equalizing pulse period;

means for enabling printing said one color of said video data from said column unit of said video data when said one color of said video data from said column unit of said video data is read from said line memory means during a remainder of said field period that excludes said synchronizing and equalizing pulse period; and digital-to-analog converter means for converting said field unit of said video data into analog signals for enabling said visual display of said video data.

10. A high speed color video printer, comprising:

means for providing color video data from a video signal;

data conversion means for storing said color video data in an internal memory, and for selectively reading said color video data stored in said internal memory in columns corresponding to pixels of a raster scan of an interlaced video field;

line memory means for storing said color video data selectively read from said internal memory in columns; and printer means for column-by-column printing said color video data selectively read from said line memory means.

11. The high speed color video printer of claim 10, further comprising printing address generating means for generating printing addresses for enabling selective reading of said color video data from said internal memory during a vertical synchronizing and equalizing pulse period of a blanking interval of a first field period, and enabling said printer means to print a first of said columns of said color video data selectively read from said internal memory during a remainder of said first field period that excludes said vertical synchronizing and equalizing pulse period.

12. The high speed color video printer of claim 10, further comprising printing address generating means for generating printing addresses for enabling said printer means to print a number n of said columns of said color video data selectively read from said internal memory during a number n field period, where n is an integer ranging sequentially from 1 to a number of columns in a frame.

13. The high speed color video printer of claim 10, further comprising display means for displaying said color video data selectively read from said internal memory.

14. The high speed color video printer of claim 13, wherein said data conversion means further comprises monitoring address generating means for providing monitoring addresses of odd rows and monitoring addresses of even rows of said color video data stored in said internal memory for enabling field units of said stored color video data to be displayed on said display means.

15. The high speed color video printer of claim 14, wherein after said data conversion means has selectively read said color video data for printing, said data conversion means first provides said odd rows of an odd field of a frame of said color video data to said display means for displaying said odd rows of said odd field of said frame during a remainder of an odd field period of said odd field and second provides said even rows of an even field of said color video data to said display means during a remainder of an even field period of said even field.

16. The high speed color video printer of claim 10, wherein said internal memory comprises:

a first discrete memory for exclusively storing red chrominance components of said color video data;

a second discrete memory for exclusively storing green chrominance components of said color video data; and a third discrete memory for exclusively storing blue chrominance components of said color video data.

17. A printer, comprising:

means for separating a luminance component and a chrominance component of a video signal;

first switching means for providing, in response to a first selection signal, a first switch signal representative of one of a super video signal and said luminance and chrominance components of said video signal;

decoding means for providing sync signals and chrominance components in response to the first switch signal;

second switching means for providing, in response to a second selection signal, a second switch signal representative of one of said sync signals and said chrominance components provided from the decoding means, and external color and sync signals;

analog-to-digital converting means for providing converted chrominance components and converted external color signals by converting said second switch signal;

data converting means for providing color video data corresponding to said one of converted chrominance components and converted external color signals in response to a mode signal;

third switching means for selectively applying said color video data to line memory means in response to a third selection signal;

intermediate gradation converting means for providing said color video data of said line memory means in columns to a thermal print head for printing; and controlling means for generating said first, second, third selection signals and said mode signal to control operation of said printer.

18. The printer of claim 17, further comprised of said data converting means comprising:

internal memory means for storing said color video data;

recording address generating means for providing recording addresses for enabling said internal memory means to store said color video data on a frame-by-frame basis in response to a recording mode signal;

printing address generating means for providing printing addresses for enabling said color video data stored in said internal memory means in columns to be applied to said line memory means for printing in response to a printing mode signal;

monitoring address generating means for providing monitoring addresses of odd rows and monitoring addresses of even rows of said color video data for enabling said color video data stored in said internal memory means to be displayed on a monitor in response to a monitoring mode signal;

address selector means for selecting one of said recording addresses, said printing addresses and said monitoring addresses in response respectively to one of said recording mode signal, said printing mode signal and said monitoring mode signal; and said controlling means controlling generation of said recording mode signal, said printing mode signal, said monitoring mode signal.

19. The printer of claim 18, wherein after said printing in columns of said color video data:

first, odd rows of an odd field of a frame of said printed color video data is provided to a monitor during a remainder of an odd field period of said odd field; and second, even rows of an even field of said printed color video data is provided to the monitor during a remainder of an even field period of the even field.

20. The printer of claim 18, wherein said printing address generating means generates said printing addresses for printing of a first of said columns of said color video data during a vertical synchronizing and equalizing pulse period of a blanking interval of a first field period.

21. The printer of claim 18, wherein said printing address generating means generates said printing addresses for printing a number n of said columns of said color video data during a vertical synchronizing and equalizing pulse period of a blanking interval of a number n field period, where n is an integer ranging sequentially from 1 to a number of columns in a frame.

22. The printer of claim 18, wherein said internal memory means comprises:

a first discrete memory for exclusively storing red chrominance components of said color video data in correspondence with said recording addresses;

a second discrete memory for exclusively storing green chrominance components of said color video data in correspondence with said recording addresses; and a third discrete memory for exclusively storing blue chrominance components of said color video data in correspondence with said recording addresses.

23. A high speed printing method of a color video printer, comprising the steps of:

providing color video data from a video signal;

storing said color video data in an internal memory of data conversion means at recording addresses generated by recording address generating means of said data conversion means in response to a recording mode signal;

selectively reading in columns said stored color video data of the internal memory in columns at printing addresses generated in printing address generating means of said data conversion means and corresponding to pixels of a raster scan of an interlaced video field, in response to a printing mode signal;

storing said selectively read color video data in columns in line memory means; and printing said color video data column-by-column from said line memory means.

24. The method of claim 23 further comprising the step of said printing address generating means generating said printing addresses for a first of said columns of said selectively read color video data during a vertical synchronizing and equalizing pulse period of a blanking interval of a first field period.

25. The method of claim 23 further comprising the step of said printing address generating means generating said printing addresses for printing a number n of said columns of said selectively read color video data during a vertical synchronizing and equalizing pulse period of a blanking interval of a number n field period, where n is an integer ranging sequentially from 1 to a number of columns in a frame.

26. The method of claim 23 further comprising the step of displaying said stored color video data of the internal memory in response to a monitoring mode signal by generating monitoring addresses of odd rows and monitoring addresses of even rows of said color video data stored in said internal memory in monitoring address generating means of said data conversion means.

27. The method of claim 26 wherein said displaying step occurs after said printing step by first providing said odd rows of an odd field of a frame of said color video data to a display during a remainder of an odd field period of said odd field and second providing said even rows of an even field of said color video data to the display during a remainder of an even field period of said even field.

28. The method of claim 23, wherein said storing step comprises:
   storing red chrominance components of said color video data in correspondence with said recording addresses in a first discrete memory of said internal memory;
   storing green chrominance components of said color video data in correspondence with said recording addresses in a second discrete memory of said internal memory; and
   storing blue chrominance components of said color video data in correspondence with said recording addresses in a third discrete memory of said internal memory.

29. A high speed printing method of a color video printer, comprising the steps of:
   providing color video data from a video signal;
   storing first chrominance components of said color video data in a first discrete memory;
   storing second chrominance components of said color video data in a second discrete memory;
   storing third chrominance components of said color video data in a third discrete memory;
   selectively reading in columns one of said first, second and third chrominance components from said first, second and third discrete memories, respectively;
   storing, in columns in line memory means, said selectively read one of said first, second and third chrominance components; and
   printing column-by-column from said line memory means said stored first, second and third chrominance components.

30. The method of claim 29 further comprising the step of generating printing addresses corresponding to said first, second and third discrete memories for a first of said columns of said selectively mad one of said first, second and third chrominance components during a vertical synchronizing and equalizing pulse period of a blanking interval of a first field period.

31. The method of claim 29 further comprising the step of generating printing addresses for printing a number n of said columns of said selectively read one of said first, second and third chrominance components during a vertical synchronizing and equalizing pulse period of a blanking interval of a number n field period, where n is an integer ranging sequentially from 1 to a number of columns in a frame.

32. The method of claim 29 further comprising the step of:
   generating monitoring addresses of odd rows and monitoring addresses of even rows of said first, second and third chrominance components stored in said first, second and third discrete memories for displaying said first, second and third chrominance components stored in said first, second and third discrete memories.

33. The method of claim 32 wherein said generating step occurs after said printing step by:
   first, providing to a display said odd rows of an odd field of a frame of said first, second and third chrominance components stored in said first, second and third discrete memories during a remainder of an odd field period of said odd field; and
   second, providing to the display said even rows of an even field of said first, second and third chrominance components stored in said first, second and third discrete memories during a remainder of an even field period of said even field.

34. The video printer of claim 1, wherein said data conversion means further comprises:
   recording address generating means for generating recording addresses enabling storing color video components of said first data in said memory means;
   printing address generating means for generating printing addresses enabling selectively reading of said color video components of said first data stored in said memory means in said columns of said second data and enabling printing of visual images representative of color video components of said second data; and
   line memory means for providing said color video components of said second data selectively read from said memory means for column-by-column printing by storing said color video components of said first data in columns.

35. The video printer of claim 34, wherein said printing address generating means generates said printing addresses for printing of a first of said columns of the selectively read second data during a vertical synchronizing and equalizing pulse period of a blanking interval of a first field period.

36. The video printer of claim 34, wherein said printing address generating means generates said printing addresses for printing a number n of said columns of the selectively read second data during a vertical synchronizing and equalizing pulse period of a blanking interval of a number n field period, where n is an integer ranging sequentially from 1 to a number of columns in a frame.

37. The video printer of claim 34, wherein said data conversion means further comprises monitoring address generating means for providing monitoring addresses of odd rows and monitoring addresses of even rows of said color video components of said first data stored in said memory means for enabling field units of said color video components of said second data selectively read from said memory means to be displayed on display means.

38. The video printer of claim 34, wherein after said data conversion means has selectively read said second data for printing, said data conversion means first provides said odd rows of an odd field of a frame of said color video components of said second data to display means during a remainder of an odd field period of said odd field for enabling a visual display of said second data on said display means, and then provides said even rows of an even field of said color video components of said second data to said display means during a remainder of an even field period of said even field for enabling said visual display of said second data on said display means.

* * * * *

UNITED STATES PATENT AND TRADEMARK OFFICE
CERTIFICATE OF CORRECTION

| | | |
|---|---|---|
| PATENT NO. | : 5,452,093 | Page 1 of 1 |
| APPLICATION NO. | : 07/888857 | |
| DATED | : September 19, 1995 | |
| INVENTOR(S) | : Hee-Kuk Kwak | |

It is certified that error appears in the above-identified patent and that said Letters Patent is hereby corrected as shown below:

On the Title page, item [54] and Column 1, lines 1-5, Title, cancel "HIGH SPEED COLOR VIDEO PRINTER FOR PRINTING COLOR IMAGE DATA IN SUCCESSIVE COLUMNS DURING BLANKING INTERVALS OF A VIDEO ROSTER SCAN" and replace with
--HIGH SPEED COLOR VIDEO PRINTER FOR PRINTING COLOR IMAGE DATA IN SUCCESSIVE COLUMNS DURING BLANKING INTERVALS OF A VIDEO RASTER SCAN--.

Column 3, line 54, after "as", insert --a--.

Column 4, line 33, after "Where Tf", insert --is--; column 4, line 60, cancel "form" and replace with --from--.

Column 5, line 30, cancel "," and replace with --.--.

Column 7, line 11, after "connected", insert --to--.

Column 8, line 19, cancel "port 61." and replace with --ports 61a, 61b, 61c.--; column 8, line 69, cancel "tile" and replace with --line--.

Column 13, line 26, in claim 3, after "from said" cancel "a".

Column 17, line 51, in claim 30, cancel "mad" and replace with --read--.

Signed and Sealed this
Fourth Day of September, 2012

David J. Kappos
*Director of the United States Patent and Trademark Office*